(No Model.) 2 Sheets—Sheet 1.

B. F. ARCHER.
FERTILIZER DISTRIBUTER.

No. 298,270. Patented May 6, 1884.

WITNESSES:
Fred. G. Dieterich
A. G. Lyne

INVENTOR:
Benj. F. Archer
BY Munn & Co.
ATTORNEYS.

(No Model.) 2 Sheets—Sheet 2.

B. F. ARCHER.
FERTILIZER DISTRIBUTER.

No. 298,270. Patented May 6, 1884.

WITNESSES:
Fred G. Dieterich
A. G. Lyne

INVENTOR:
Benj. F. Archer
BY Munn & Co
ATTORNEYS.

UNITED STATES PATENT OFFICE.

BENJAMIN FRANKLIN ARCHER, OF MARIETTA, MISSISSIPPI.

FERTILIZER-DISTRIBUTER.

SPECIFICATION forming part of Letters Patent No. 298,270, dated May 6, 1884.

Application filed August 21, 1883. (No model.)

*To all whom it may concern:*

Be it known that I, BENJAMIN FRANKLIN ARCHER, of Marietta, in the county of Prentiss and State of Mississippi, have invented a new and useful Improvement in Fertilizer-Distributers, of which the following is a full, clear, and exact description, reference being had to the annexed drawings, forming part of this specification.

This invention relates to wheeled fertilizer-distributers; and the invention consists of the novel construction hereinafter described and claimed.

Figure 1:
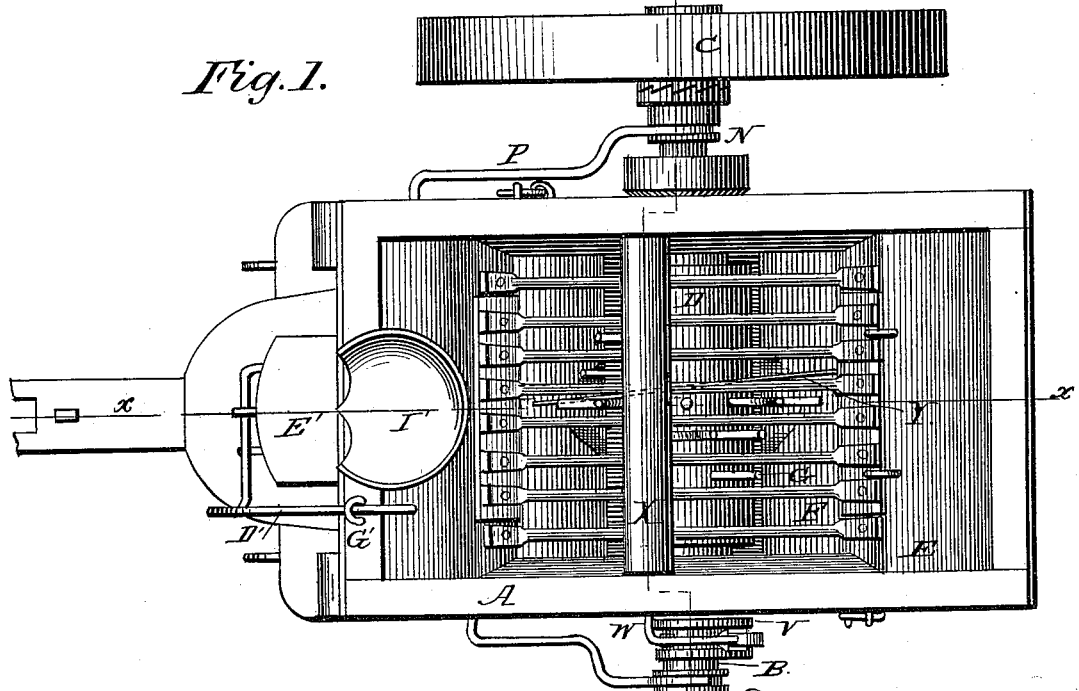
Figure 2:
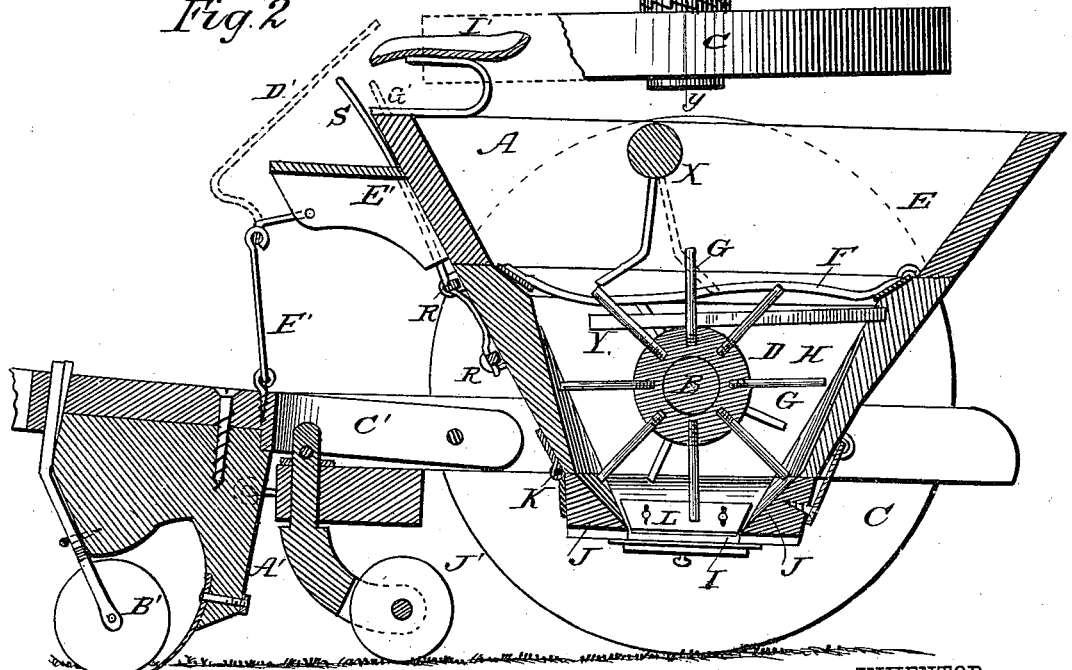
Figure 3:
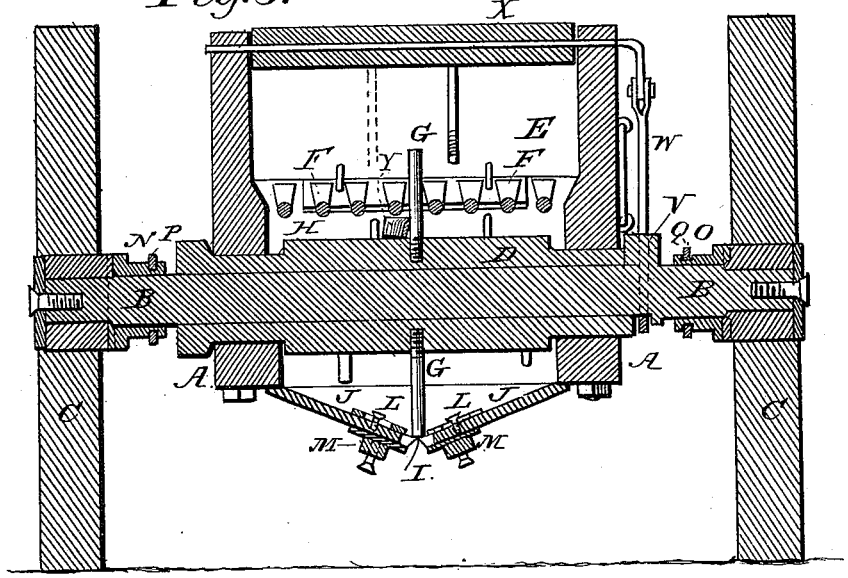
Figure 4:
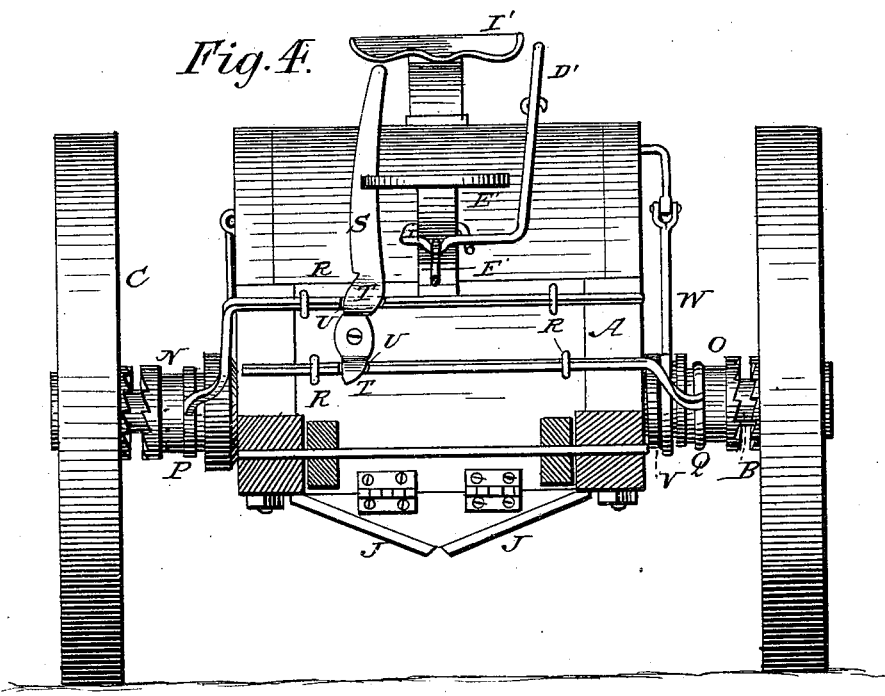

In the drawings, Figure 1 is a plan view of my improved fertilizer-distributer. Fig. 2 is a vertical section of the same on line $x$ $x$ of Fig. 1. Fig. 3 is a cross-section on line $y$ $y$ of Fig. 1, and Fig. 4 is a front elevation with the tongue cut away.

A indicates the wagon-bed or hopper for carrying the fertilizer, and B is the supporting-axle, and C C the wheels, which are loosely mounted thereon. The front and rear walls of the upper part or compartment of the hopper converge toward each other to guide the fertilizer to the cutting or disintegrating and distributing roller D, which is rigidly secured to the axle B. The bottom of the upper compartment, E, is formed by a grating, F, which fits over the roller D, and through which the pegs or teeth G of the roller are adapted to be moved to draw the fertilizer gradually into the lower compartment, H. The grating, which is curved in such manner that the coarse lumps of fertilizer shall by their own weight move to the front end of the hopper to allow the teeth G to roll and grind them down until they pass through, is pivoted at one end, and is adapted to be turned up at the other for convenience in cleaning the roller. The lower compartment, H, is provided with side and end walls, which converge toward a slot, I, in the line of the furrow into which the fertilizer is to be distributed, in order that the fertilizer, as it descends from the upper compartment, shall be guided to the longitudinal slot I in the bottom of said lower compartment, and within reach of the distributing-teeth G at the center of the roller, by which teeth it is fed to the furrow. The converging walls which form the bottom J of the lower compartment are hinged at K, and adapted to be opened downward like a door, in order that said compartment may be easily reached when necessary. The size of the slot I is to be regulated by the adjustable plates L M, arranged, respectively, on the inside and outside of the bottom J.

On the axle B are arranged clutch-boxes N O, which are adapted to engage with corresponding clutches on the wheels C C, for communicating motion to the roller D. To the boxes N O are connected bent rods P Q, respectively, which are supported in guides R on the front outer surface of the hopper A, and with these rods engages a lever, S, which is pivoted to the hopper at a point between them. The lever is provided with curved edges T, which bear against shoulders U on the rods, and have the effect of cams in shifting the rods and clutch-boxes. With this construction the lever is arranged in a vertical position, where it can be readily reached by the driver, who occupies a seat on the hopper, and a single movement of the lever will shift the two rods in opposite directions, either for moving the clutch-boxes outward to engage the wheels or inward to ungear the axle and roller therefrom. The axle B, at one end, is provided with an eccentric, V, and pitman W, which are connected to a toothed rock-shaft, X, supported near the top of the hopper, and adapted to stir the fertilizer to prevent it from baking and arching over the roller.

As a convenient means of regulating the depth of furrow, I attach the opening-plow A' and rotary cutter B' to the hounds C' of the tongue, and adapt the hounds to be supported in a raised position by means of a lever, D', pivoted to the foot-rest E', and connected to the hounds by a rod, F'. When the lever is placed in engagement with the catch G', the hounds will be elevated above their normal position, and so held, while the tongue H', which is pivoted to the forward end of the hounds, will be elevated only at the rear, and without inconvenience to the team.

I' is a seat for the driver, and J' is a caster located under the forward end of the hopper-frame, which not only serves to support the forward end of the machine, but by following the furrow just behind the plow it guides and holds the machine in position for putting the fertilizer directly in the furrow.

Y indicates a spring-scraper attached to the rear part of the hopper-frame and extended across the roller, underneath the grating F, in such manner that its forward and free end shall bear against the teeth G as they successively pass the same. The spring is made flat, and has a sharp edge which is turned upward, so as to scrape the teeth longitudinally and remove any adhering substance or fiber that may be in the fertilizer.

What I claim is—

1. The combination of the axle carrying the distributing toothed roller, the hopper having an upper compartment with walls converging toward the said roller, and a lower compartment with hinged bottom and walls converging toward the line of the furrow, the hinged grating forming the bottom of the upper compartment, the spring-scraper, and the inner and outer gage-plates in the outlet-slot, substantially as shown and described.

2. The combination of the hounds C', the opening-plow A', and cutter B', secured to said hounds, the lever D', the rod F', connecting the lever to the hounds, and the catch G', for holding the lever, substantially as shown and described, whereby the tongue and hounds may be adjusted and held in a position to support the plow and cutter at an elevation, to regulate the depth of furrow, as specified.

3. The hopper having the lower compartment, H, provided with converging side and end walls, and the hinged bottom J, formed in one piece, and adapted to be opened downward, and having a slot, I, and plates L M, substantially as shown and described.

BENJAMIN FRANKLIN ARCHER.

Witnesses:
  THOS. R. KIMZER,
  GEO. W. WALTRIP.